Feb. 26, 1952 V. O. HARTZ 2,587,154
ROTARY FLUID COUPLING
Filed Oct. 26, 1946 2 SHEETS—SHEET 1

INVENTOR
VERNON O. HARTZ
BY
ATTORNEYS

Feb. 26, 1952     V. O. HARTZ     2,587,154
ROTARY FLUID COUPLING

Filed Oct. 26, 1946     2 SHEETS—SHEET 2

INVENTOR
VERNON O. HARTZ
BY
ATTORNEYS

Patented Feb. 26, 1952

2,587,154

UNITED STATES PATENT OFFICE 2,587,154

ROTARY FLUID COUPLING

Vernon O. Hartz, Glendale, Calif.

Application October 26, 1946, Serial No. 706,040

9 Claims. (Cl. 60—54)

The present invention relates to a fluid drive mechanism, and more particularly to a fluid drive mechanism for providing free relative rotation between a driving and a driven shaft at relatively low speeds of rotation of the driving shaft, and for providing firm driving connection between the shafts at high speeds of rotation.

Various types of fluid drive mechanisms have been in use for many years. While many of such mechanisms provide excellent driving characteristics at high speeds, they do not permit free relative rotation between a driving and a driven rotating member at low speeds of rotation of a driving member. This latter feature has influenced some engineers in preferring an ordinary friction clutch driving arrangement to the so-called fluid drive mechanisms in order to insure free rotation of the driving member or engine at low speeds when the driven member is at rest.

An object of the present invention is to make an improved and simplified fluid drive mechanism.

Another object is to make a fluid drive mechanism having a plurality of pivotally mounted driving vanes arranged to be moved to driving position by the centrifugal force produced by rotation of a driving element in which the driving vanes are mounted.

Another object is to make a fluid drive mechanism having a plurality of driving vanes pivotally mounted on a rotor, with a weight assembly secured to each of the vanes, the center of gravity of each vane assembly being offset from an axis of pivotal mounting of the vane, so that the vane will be carried to an operative driving position by centrifugal force on the attainment of a predetermined speed of rotation by the rotor on which the vanes are mounted.

Another object is to make an improved fluid drive mechanism having a driving rotor with a plurality of pivotally mounted guiding vanes therein, the vanes being unbalanced both as to weight and vane surface relatively to their axes of pivotal mounting, centrifugally actuated positioning means being associated with the vanes to move them to a position of maximum driving effectiveness on a predetermined increase in rotative speed of their rotors.

Another object is to provide a fluid drive mechanism with pivotally mounted vanes which are removable endwise from their mounted position on rotation of the vanes beyond an operative position thereof.

Another object is to make an improved fluid drive mechanism having a power driven rotor with a plurality of pivotally mounted driving vanes therein, and having means to move the vanes pivotally toward an effective driving position.

In order to attain these and other objects of my invention there is provided in accordance with one feature of the invention, a rotor having a plurality of pivotally mounted vanes or blades which are removable from the rotor by turning the vanes to a position substantially 180° from their normal operative position; the vanes having counterweights assembled co-axially therewith, to provide an assembly with its center of gravity located radially outwardly beyond the pivotal axes of the vanes, so that on rotation of the rotor the vanes will be moved by the centrifugal force of the weights to an operative driving position. The vanes are constructed with the major portion of their operative surfaces located radially outwardly beyond their axes of pivotal mounting, so that without the influence of the weights the vanes normally would assume a feathering position relatively to fluid in which the vanes are immersed. The rotor is mounted in a rotatable housing arranged to drive a driven shaft, the housing being provided with internally projecting vanes adapted to cooperate with the vanes of the rotor to provide driving connection between the rotor and the housing.

These and other features and advantages of the invention will be more fully set forth in the following description and the accompanying drawings, of which there are two sheets. In the drawings.

Figure 1:
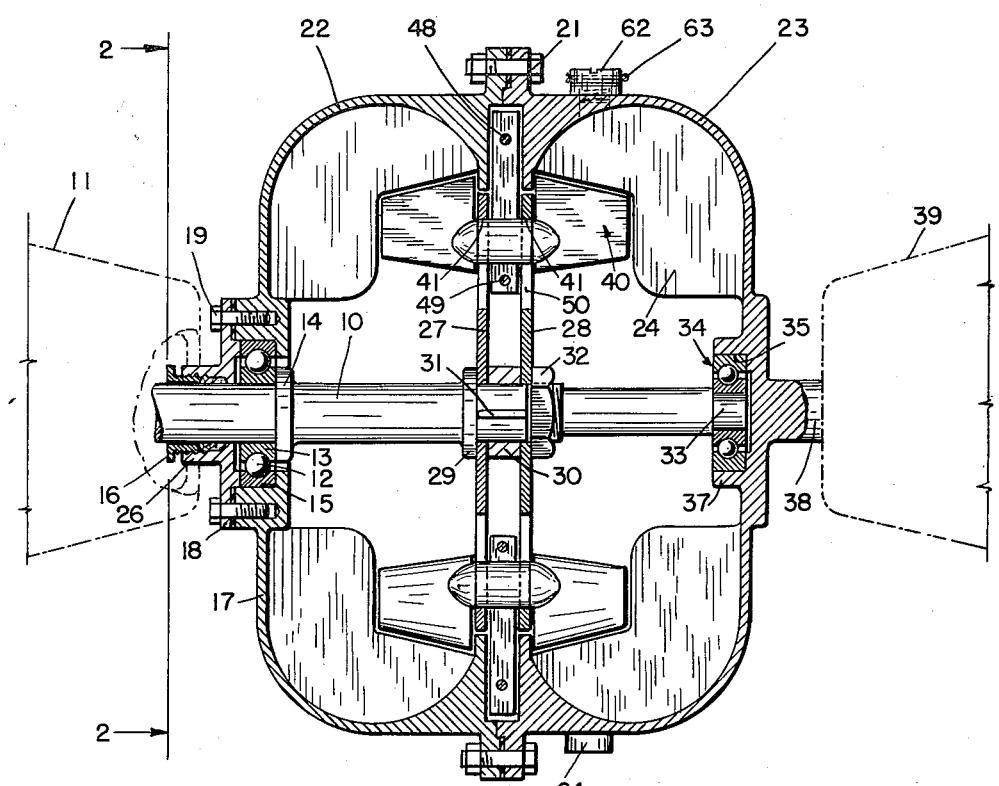
Fig. 1 is a longitudinal sectional view through a fluid drive mechanism embodying the present invention.
Figure 3:
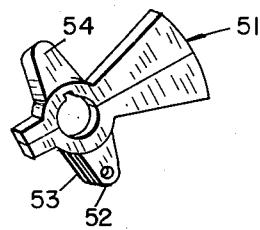
Fig. 3 is a view in perspective of a counterweight employed in a modification shown in Fig. 6.
Figure 4:
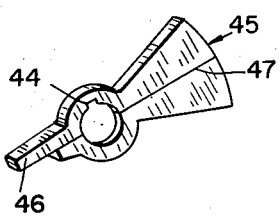
Fig. 4 is a view, also in perspective, of a counterweight such as is illustrated in the embodiment of Figs. 1 and 2.
Figure 5:
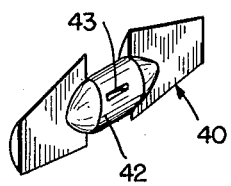
Fig. 5 is a view in perspective of a driving vane with the counterweight removed therefrom.
Figure 2:
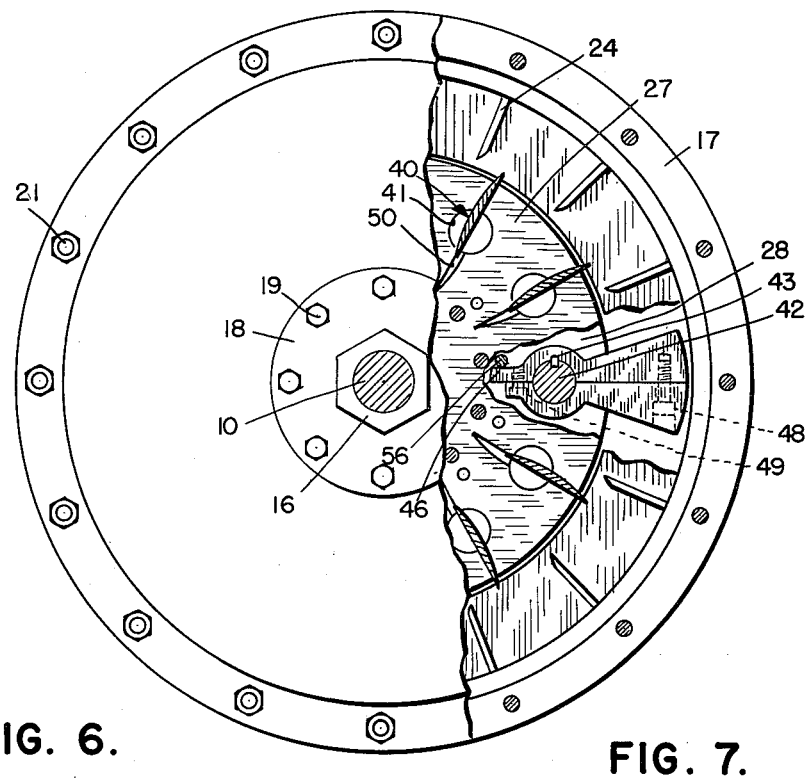
Fig. 2 is an elevation view on the line 2—2 of Fig. 1, a portion of a housing being broken away to disclose the inner construction of the device; a portion of one of a pair of central rotor disks, and an annular housing wall member being further broken away to disclose a counterweight secured to the pivotally mounted hub of a driving vane.
Figure 6:
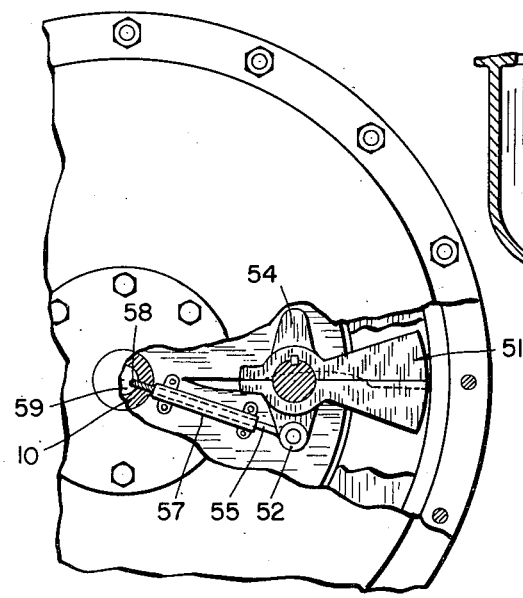
Figure 7:
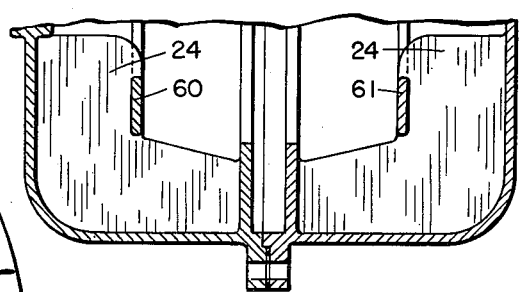

Fig. 6 is a fragmentary view in side elevation similar to Fig. 2, but showing only a small portion of the outer housing and central walls broken away to show a counterweight of the type illustrated in Fig. 3 connected to a control mechanism for securing the counterweight in radially adjusted operating position; and Fig. 7 is a fragmentary transverse sectional view through a marginal portion of a housing, the vane mounting arrangement being modified from that illustrated in Fig. 1.

Referring to the drawings in detail, and considering first what may be referred to as the normal embodiment of my invention illustrated in Figs. 1, 2, 4 and 5; a drive shaft 10 is arranged to have operative driven connection with a suitable source of power, for example a gasoline engine, a portion of which may be considered as indicated by the dot-dash lines 11 in Fig. 1. The drive shaft is rotatably mounted in a ball bearing 12, the inner race 13 of which is secured in position against a collar 14 formed integrally with the drive shaft 10. The outer race of the bearing 12 is mounted in a recess 15 in the hub portion of a housing 17, by means of a flanged cap 18.

The cap 18 is secured in position by a plurality of screws 19. An oil seal, such as a gland nut 16, is threaded onto a flange 26 surrounding the drive shaft 10 to seal the joint between the shaft 10 and the cap 18 against the escape of oil from the housing 17. The housing 17 is of the split type and the two halves thereof are secured together by means of bolts 21.

A pair of annular planiform walls 22 and 23 are disposed in parallel relation with each other on opposite sides of the central plane of the divided housing and a plurality of radially disposed vanes 24 are provided at equally spaced intervals around the interior of each side of the housing between the central annular walls 22 and 23 and the outer walls of the housing. These vanes 24 may be shaped substantially as illustrated in Figs. 1 and 7, each vane having a corner portion cut away to permit rotor blades, to be described in detail later herein, to pass closely adjacent thereto.

A pair of rotor discs 27 and 28 are mounted on the drive shaft 10, the disc 27 being in abutment with an annular flange 29 formed integrally with the shaft 10. The rotor discs 27 and 28 are spaced apart by a spacing collar 30. The rotor discs 27 and 28, and the spacing collar 30, are provided with keyways to receive a key 31 mounted in a keyway in the shaft 10 to provide positive driving connection between the drive shaft and the rotor discs. The rotor discs are secured in position by a nut 32 which is threaded onto the shaft 10 to engage the rotor disc 28 and draw the parts into closely assembled relation. The end portion of the shaft 10 beyond the rotor discs may be reduced as at 33, and pressed into the inner race of a ball bearing 34. The outer race of the ball bearing 34 is mounted in an annular recess 35 in the housing 17, and may be secured in position therein by flanging the marginal edge portion surrounding the recess 35 to overlie the outer race of the ball bearing as indicated at 37 in Fig. 1.

A driven shaft 38 is secured to the housing 17 to extend co-axially with the drive shaft 10. The driven shaft may be secured to a mechanism which it is desired to drive by means of the present fluid drive mechanism, such as is indicated generally by the dot-dash lines 39. A plurality of vanes 40 (see Fig. 5) are pivotally mounted in pairs of aligned co-axial holes 41 in the rotor plates 27 and 28. Each of the vanes is provided with a cylindrical central hub portion 42 adapted to pivot in the pair of registering holes 41 in the rotor discs in which it is mounted. The vanes are of a size to pass closely adjacent to the inner notched out edges of the vanes 24 in the housing 17 when the rotor vanes are positioned radially, as shown in Fig. 2. Each rotor vane hub portion 42 is provided with a key 43 which is provided to enter a keyway 44 cut in one half of a divided counterweight 45 which is assembled with each of the vanes, as illustrated in Figs. 1 and 2.

These counterweights are divided along a central line 47 and are secured together by means of screws 48 and 49, as indicated in dotted lines in Fig. 2.

To facilitate mounting the drive vanes 40 in the rotor discs 27 and 28, the holes 41 in the rotor discs preferably are formed with elongated notches 50 extending radially inwardly therefrom. These notches, together with the holes 41, are of a size to permit the vanes to pass endwise therethrough when the vanes are rotated 180° from their radially outward position illustrated in Figs. 1 and 2. It is apparent, of course, that with the counterweights of the relative size illustrated, and the rotor vanes positioned as closely together as is shown in Fig. 2, it will be necessary to remove the counterweights before rotating the vanes for removal.

One portion of the counterweight has an extension 46 thereon which is adapted to engage a pin 56 inserted transversely between the rotor discs at each counterweight position. The pins 56 are positioned to engage the counterweight extensions when the vanes are in full radially extended position. The pins act as stops to prevent rotation of the vanes to a reversely feathered position where it is desirable that the motive means, such for example as an automobile engine, acts as a drag or brake in going down long grades. Where no such restrictive action is desired the pins 56 may be omitted to permit free pivotal movement of the vanes within their limits of operation.

A modified form of counterweight is illustrated in Figs. 3 and 6. In this modified form a counterweight 51 is provided with a pair of ears 52 and 53 projecting laterally therefrom substantially at right angles to the central dividing plane of the counterweight. A corresponding ear 54 may be provided on the side of the counterweight opposite to the ears 52 and 53 to balance the centrifugal force of the ears 52 and 53 and their supported parts during high speed rotation of the rotor.

The ears 52 and 53 are secured to a thrust pin 55 which is mounted in a tubular socket 57. The thrust pin 55 is arranged to be actuated by a push-pull mechanism such as a control wire 58 which passes through a central opening 59 in the drive shaft 10.

In the modification illustrated in Fig. 7, a pair of annular side plates 60 and 61 are mounted on the sides of the notched out portions of the housing vanes 24. These side plates restrict vortexing of the liquid displaced by the rotor vanes during operation of the device when the rotor vanes are in partly feathered position.

A filler plug 62 is mounted in a side of the housing 17 in a threaded filler opening provided in the housing to receive it. The plug is secured in tightly sealing position in the filler opening as by means of a lock wire 63. A boss 64 is provided on the side of the housing opposite the filler plug to serve as a counterweight to balance the weight of the filler plug.

In operating the device, the housing 17 is filled with suitable liquid, for example, liquid of the type used in hydraulic brakes. The drive shaft is arranged for rotation by means of a suitable source of power, and the driven shaft 38 is connected as required to a driven element such, for example, as an automobile transmission element. At low speeds of rotation of the drive shaft 10, the centrifugal force of the counterweights 45 or 51 will exert a relatively small amount of torque on the rotor vanes, while the unbalance of the blade surfaces of the rotor vanes with respect to their axes of pivotal mounting, will exert a considerable force tending to move them into a feathered position relatively to their direction of travel through the liquid in the housing. During this slow speed phase of operation of the drive shaft 10 the outer ends of the counterweights also will be restricted considerably in their passage through the liquid in which they move, which will tend to move them likewise into a trailing or feathered condition. The combination of the liquid forces on the counterweights and the blades or vanes thus exerted will greatly exceed the torque of the relatively small amount of centrifugal force exerted by the counterweights at such low speeds.

As the speed of rotation of the drive shaft increases, a driving torque will be transmitted to the vanes in the housing thereby causing the housing and its associated parts to rotate with increasing speed. As the speed of rotation of the housing increases, the increasing centrifgual force on the counterweights tends to move them radially outward, thereby moving the drive vanes into alignment with radii of the rotor through their axes. This action brings the edges of the rotor vanes closely adjacent to the housing vanes and still further increases the driving effect of the rotor.

As the combined speed of the rotor and housing increases, centrifugal force acting on the liquid in the housing tends to increase its resistance to vortex flow under the action of the vanes and provides an effective driving connection between the drive shaft 10 and the driven shaft 38.

The modification illustrated in Fig. 6 would be unnecessary with mechanisms requiring ordinary or relatively low torques at low speeds. However, in such mechanisms as tractors and, for example, earth moving equipment, it frequently is necessary to supply a high driving torque at relatively low speeds of the driven shaft. In such instances it may be desirable to be able to assist the centrifugal force of the weights tending to move the rotor vanes into radial position, and in such cases an auxiliary mechanism illustrated in Fig. 6 may be used to assist the counterweights and their associated vanes in moving into such radial position.

By employing the auxiliary torque operation illustrated in Fig. 6 and omitting the counterweight portion so as to bring the center of gravity of each vane substantially within its axis of pivotal movement, the pivotal movement of the vanes may be controlled entirely by the operator through manipulation of this auxiliary mechanism.

In case it should be necessary to replace one of the vanes, this can be accomplished readily by removing the marginal housing bolts 21 and removing the right hand portion of the housing, as illustrated in Fig. 1, the counterweight then can be removed from the vane which it is desired to replace by removing the two screws 48 and 49 and separating the two halves of the counterweight. The vane 40, to be removed, then may be turned 180° from the position illustrated in Fig. 1 to bring the vane into alignment with the notches 50 of corresponding shape and size in the rotor discs 27 and 28. The vane then may be moved endwise out through these slotted openings in the rotor discs, and the new vane can be inserted by reversing the above procedure.

While I have illustrated and described a preferred form of my invention and some modifications thereof, it will be apparent to those familiar with the art that the device is capable of further modification without departing from the spirit and scope of the invention. It is desired, therefore, not to limit the invention except as set forth in the following claims.

I claim:

1. A fluid drive mechanism comprising a rotor adapted to be connected to a power driven shaft, said rotor having a pair of spaced, parallel rotor discs mounted on said shaft, said rotor discs having a plurality of pairs of circular oppositely registering openings disposed uniformly about the marginal areas thereof, each of said openings having an elongated notch extending therefrom, a plurality of rotor vanes pivotally mounted one in each pair of said circular openings, each vane being offset in the plane of the vane from its axis of pivotal mounting, weighted means secured to pivot co-axially with each vane and mounted between said rotor discs, said counterweight being pivotally movable outwardly to lie along a radius of said rotor discs, a liquid containing housing enclosing said rotor and its parts and rotatable relatively thereto and co-axially therewith, and a plurality of housing vanes each of which is mounted to lie peripherally beyond said rotor vanes, said housing vanes being disposed to lie substantially in radial planes of the housing about its axis of rotation, the inner edges of the housing vanes being adapted to fit closely adjacent the peripheral edges of the rotor vanes in the maximum outward position of said weighted means.

2. A fluid drive mechanism comprising a rotor adapted to be connected to a power driven shaft, said rotor having a pair of spaced, parallel, rotor discs mounted on said shaft, said rotor discs having a plurality of pairs of circular oppositely registering openings disposed uniformly about the marginal areas thereof, each of said openings having an elongated notch extending therefrom toward the shaft axis, a plurality of rotor vanes, a hub on each rotor vane adapted to be pivotally mounted in a pair of said circular rotor openings, said vanes having a slidable endwise entering fit in said notches, each vane being offset in the plane of the vane from its axis of pivotal mounting, a counterweight secured to pivot co-axially with each vane and mounted between said rotor discs, said counterweight being pivotally movable outwardly to lie along a radius of said rotor discs, the outer portion of each counterweight in such outward position projecting beyond the peripheries of said rotor discs, a liquid containing housing enclosing said rotor and its parts and rotatable relatively thereto and co-axially therewith, a pair of spaced, parallel annular rings mounted within said housing to be co-extensive with said rotor discs and closely adjacent the peripheries of said rotor discs, said annular rings being adapted to receive said counterweights therebetween on a pivotal outward movement of said counterweights, and a plurality of housing vanes each of which is fixedly mounted between the housing and an outer face of one of said annular rings, said fixed vanes being disposed to be in radial planes of the housing about its axis of rotation, the inner edges of the housing vanes being shaped to fit closely adjacent the rotor vanes in the maximum outward position of said counterweights.

3. A fluid drive mechanism comprising a rotor adapted to be connected to a power driven shaft, said rotor having a pair of spaced, parallel rotor discs mounted on said shaft, said rotor discs having a plurality of pairs of circular, oppositely registering, openings disposed uniformly about the marginal areas thereof, each of said openings having an elongated notch extending therefrom toward the shaft axis, a plurality of rotor vanes, each vane comprising a central annular hub portion and a planiform vane portion offset laterally from said hub portion, the hub portion of each rotor vane being adapted to be pivotally mounted in a pair of said circular rotor openings, each of said vane portions having a slidable endwise entering fit in said notches, each vane portion being offset in the plane of the vane outwardly from its axis of pivotal mounting, a counterweight secured to the hub of each vane to pivot coaxially therewith, and mounted between said rotor discs, said counterweights being pivotally movable outwardly to lie along a radius of said rotor discs, a liquid containing housing enclosing said rotor and its parts and rotatable relatively thereto and co-axially therewith, and a plurality of housing vanes each of which is fixedly mounted in the housing, said housing vanes being disposed to lie in radial planes of the housing about its axis of rotation, the inner edges of the housing vanes being shaped to fit closely adjacent the peripherally outer edges of the rotor vanes in the maximum outward position of said counterweights.

4. A fluid drive mechanism comprising a rotor adapted to be connected to a power driven shaft, said rotor comprising a rotor disc secured to said shaft, said rotor disc having a plurality of circular openings disposed uniformly about the marginal area thereof, each of said openings having a notch extending therefrom, a plurality of rotor vanes each having a hub portion and a planiform vane portion laterally offset from the hub portion, the hub portion of each vane being pivotally mounted in one of said circular rotor openings, a portion of each of said vanes having a slidable endwise entering fit in said notches, in a non-operating position of said vanes only, a counterweight secured to pivot co-axially with each vane, said counterweight being pivotally movable outwardly to an operative position of said vane to lie along a radius of said rotor discs, a liquid containing housing enclosing said rotor and its parts and rotatable relatively thereto and co-axially therewith, and a plurality of housing vanes each of which is fixedly mounted within the housing, the inner edges of the housing vanes being shaped to fit closely adjacent the peripherally outer edges of the rotor vanes in the maximum outward position of said counterweights.

5. A fluid drive mechanism comprising a rotor adapted to be connected to a power driven shaft, said rotor comprising a rotor disc secured to said shaft, said rotor disc having a plurality of circular openings disposed uniformly about the marginal area thereof, each of said openings having an elongated notch extending therefrom toward the shaft axis, a plurality of rotor vanes, each of said vanes comprising a hub portion adapted to be pivotally mounted in one of said circular rotor openings, and a pair of planiform vanes mounted one on each end of said hub portion, said vanes having a slidable endwise entering fit in said notches, each vane being offset in the plane of the vane from the axis of pivotal mounting of said hub portion, a counterweight secured to said hub portion to pivot co-axially with said vanes, said counterweight being pivotally movable outwardly to lie along a radius of said rotor discs, the outer portion of said counterweight in such outward position projecting beyond the periphery of said rotor disc, a liquid containing housing enclosing said rotor and its parts and rotatable relatively thereto and co-axially therewith, a pair of parallel annular rings mounted within said housing to enclose the space traversed by said outer portions of said counterweights beyond the rotor disc, and a plurality of housing vanes each of which is mounted between the housing and an outer face of one of said annular rings, said housing vanes being disposed to lie in radial planes of the housing about its axis of rotation, the inner edges of the housing vanes being shaped to fit closely adjacent the rotor vanes in the maximum outward position of said counterweights.

6. A rotary fluid coupling comprising a rotor adapted to be connected to a power driven shaft and having a pair of spaced parallel rotor discs, a plurality of pairs of rotor vanes pivotally mounted uniformly about the marginal areas of said discs, the vanes of each pair being disposed respectively on the outer sides of said discs and being connected by a hub mmeber extending through said discs, each vane being offset in the plane of the vane from its axis of pivotal mounting, a counterweight secured to each of said hub members between said discs, a liquid containing housing enclosing said rotor and its parts and rotatable relatively thereto and co-axially therewith, and a plurality of housing vanes each of which is mounted to lie peripherally beyond said rotor vanes, said housing vanes being disposed to lie substantially in radial planes of the housing about its axis of rotation, the inner edges of the housing vanes being adapted to fit closely adjacent the peripheral edges of the rotor vanes in the maximum outward position of said counterweights.

7. A rotor-impeller for a rotary fluid coupling adapted to be connected to a power-driven shaft and positioned within a rotatable housing runner, comprising circular blade mounting means, vanes pivotally mounted in pairs uniformly about the peripheral marginal area of the mounting means with the blades of each pair disposed one on each side of said mounting means, and a weight for each pair of blades, said weights being positioned between the blades of each pair and mounted for pivotal movement with the blades.

8. A rotor-impeller for a rotary fluid coupling adapted to be connected to a power-driven shaft and positioned within a rotatable housing runner, comprising circular blade mounting means, said mounting means defining an uninterrupted space extending inward from the periphery, vanes pivotally mounted in pairs uniformly about the peripheral marginal area of the mounting means with the blades of each pair disposed one on each side of said mounting means, and a weight for each pair of blades, said weights being positioned between the blades of each pair and in said space and mounted for pivotal movement with the blades.

9. A rotor-impeller for a rotary fluid coupling adapted to be connected to a power-driven shaft and positioned within a rotatable housing runner, comprising a pair of spaced parallel rotor discs, a plurality of pairs of rotor vanes pivotally mounted uniformly about the marginal areas of said discs, the vanes of each pair being disposed respectively on the outer sides of said discs and being connected by a hub member extending through said discs, each vane being offset in the plane of the vane from its axis of pivotal mounting, and a counterweight secured to each of said hub members between said discs.

VERNON O. HARTZ.

REFERENCES CITED

The following references are of record in the file of this patent:

UNITED STATES PATENTS

| Number | Name | Date |
| --- | --- | --- |
| 905,885 | Kingman | Dec. 8, 1908 |
| 1,540,453 | Arave | June 2, 1925 |
| 2,150,539 | Carson et al. | Mar. 14, 1939 |
| 2,190,830 | Dodge | Feb. 20, 1940 |
| 2,303,829 | Dodge | Dec. 1, 1942 |
| 2,333,674 | Powell | Nov. 9, 1943 |
| 2,377,009 | Heyer | May 29, 1945 |
| 2,428,134 | Zeidler | Sept. 30, 1947 |